US012584582B2

(12) United States Patent
Heo et al.

(10) Patent No.: US 12,584,582 B2
(45) Date of Patent: Mar. 24, 2026

(54) PIPE PORT AND PIPE INCLUDING THE SAME

(71) Applicants: Hyundai Motor Company, Seoul (KR); Kia Corporation, Seoul (KR); TAEKWANGFUJIKIN CO., LTD, Busan (KR)

(72) Inventors: Jin Young Heo, Gyeonggi-do (KR); Yong Ki Kim, Busan (KR); Jae Young Kim, Busan (KR); Chae Eon Kim, Busan (KR)

(73) Assignees: Hyundai Motor Company, Seoul (KR); Kia Corporation, Seoul (KR); Taekwangfujikin Co., Ltd., Busan (KR)

( * ) Notice: Subject to any disclaimer, the term of this patent is extended or adjusted under 35 U.S.C. 154(b) by 0 days.

(21) Appl. No.: 18/969,152

(22) Filed: Dec. 4, 2024

(65) Prior Publication Data

US 2025/0354641 A1    Nov. 20, 2025

(30) Foreign Application Priority Data

May 20, 2024    (KR) ........................ 10-2024-0065369

(51) Int. Cl.
*F16L 41/08*          (2006.01)
*F16L 41/14*          (2006.01)
        (Continued)

(52) U.S. Cl.
CPC ............. *F16L 41/08* (2013.01); *F16L 59/065* (2013.01); *F16L 41/14* (2013.01); *F16L 55/07* (2013.01)

(58) Field of Classification Search
CPC ....... F16L 41/08; F16L 59/065; F16L 39/005; F16L 41/005; F16L 41/021; F16L 41/14;
        (Continued)

(56) References Cited

U.S. PATENT DOCUMENTS 2,410,912 A * 11/1946 Wenk
3,645,496 A *  2/1972 Rawlins
        (Continued)

FOREIGN PATENT DOCUMENTS

KR      10-2014-0111158 A      9/2014

*Primary Examiner* — William S. Choi
(74) *Attorney, Agent, or Firm* — Fox Rothschild LLP

(57)          ABSTRACT

A pipe port includes a connector member having a recessed region with a shape recessed inward, an adapter member inserted into the recessed region of the connector member, and a first sealing member and a second sealing member provided between the connector member and the adapter member, in which the first sealing member and the second sealing member are made of different materials, such as an O-ring and a metal seal, to enhance sealing performance. This configuration ensures a reliable seal in applications requiring vacuum or negative pressure states within a pipe, improving the overall integrity and functionality of the pipe system. The pipe port is particularly suited for maintaining distinct pressure conditions within defined spaces, making it ideal for use in various industrial and technical applications where differential pressure control is critical. A pipe including the pipe port features a secure connection and effective sealing to maintain desired pressure states.

18 Claims, 8 Drawing Sheets

(51) Int. Cl.
    *F16L 55/07*        (2006.01)
    *F16L 59/065*      (2006.01)

(58) Field of Classification Search
    CPC ....... F16L 55/07; F16L 55/1604; F16L 41/02;
                                                     F16L 2201/30
    USPC ........................................................ 285/904
    See application file for complete search history.

(56)                 References Cited

U.S. PATENT DOCUMENTS

| | | | |
|---|---|---|---|
| 3,967,838 | A * | 7/1976 | Legris ..................... F16L 41/08 |
| 4,074,703 | A * | 2/1978 | Smith ..................... F16L 41/14 |
| 10,788,002 | B2 * | 9/2020 | Touchette ............... F16L 41/08 |
| 11,460,366 | B2 * | 10/2022 | Pistone |
| 2013/0118187 | A1 * | 5/2013 | Carrubba |
| 2019/0063607 | A1 * | 2/2019 | Kesler |
| 2022/0152729 | A1 * | 5/2022 | Toguyeni ............. F16L 59/065 |
| 2025/0214417 | A1 * | 7/2025 | Mirza |

* cited by examiner

10

300

200

300

PIPE PORT AND PIPE INCLUDING THE SAME

CROSS-REFERENCE TO RELATED APPLICATION

This application claims under 35 U.S.C. § 119(a) the benefit of Korean Patent Application No. 10-2024-0065369 filed in the Korean Intellectual Property Office on May 20, 2024, the entire contents of which are incorporated herein by reference.

BACKGROUND

Technical Field

The present disclosure relates to a pipe port and a pipe including the same, and more particularly, to a pipe port, which is used to create a vacuum or negative pressure state in a space formed in a pipe, and the pipe including the same. The pipe port includes distinct sealing members made of different materials, such as O-rings and metal seals, arranged between a connector member and an adapter member to ensure reliable sealing under various conditions. This configuration enhances the performance and integrity of the pipe system by maintaining the desired pressure state effectively.

Background

In the case of a pipe for transporting a cryogenic fluid such as liquid state hydrogen, it is necessary to minimize heat exchange between the cryogenic fluid and the outside of the pipe. To this end, the pipe for transporting the cryogenic fluid generally has an inner pipe and an outer pipe. More specifically, an internal space of the inner pipe serves as a route through which the cryogenic fluid flows, and a space defined between the outer pipe and the inner pipe serves as a thermal insulator that suppresses heat exchange between the outside of the pipe and the cryogenic fluid. In this case, in order for the space, which is defined between the outer pipe and the inner pipe, to serve as the thermal insulator, it is necessary to create a vacuum or negative pressure state in the space, which is defined between the outer pipe and the inner pipe, by discharging air from the space to the outside, and then to ensure sealability of the space defined between the outer pipe and the inner pipe.

In the related art, in order to ensure the sealability, a plurality of O-ring members has been applied to a pipe port that provides a route through which air in the space defined between the outer pipe and the inner pipe is discharged. However, in the related art, the O-ring member is generally manufactured by using a material such as rubber or resin, which causes a problem in that there is a limitation in ensuring the sealability of the pipe.

SUMMARY

Accordingly, an object of the present disclosure is to remarkably improve sealability of a region in which vacuum or negative pressure is created to allow a pipe for transporting a cryogenic fluid to perform a thermal insulation function.

In order to achieve the above-mentioned object, one aspect of the present disclosure provides a pipe port including: a connector member having a recessed region with a shape recessed inward; an adapter member inserted into the recessed region of the connector member; and a first sealing member and a second sealing member provided between the connector member and the adapter member, in which the first sealing member and the second sealing member are made of different materials.

The first sealing member may be an O-ring member, and the second sealing member may be a metal seal member.

A first through-hole, which is provided to face the adapter member, may be formed in the connector member, and the second sealing member may be provided between the first through-hole and the adapter member.

The first sealing member may be provided to be spaced apart from the second sealing member in a direction in which the adapter member and the first through-hole face each other.

The recessed region may include: a first recessed region configured to define a space in which the second sealing member is provided; and a second recessed region provided to face the second sealing member with the first recessed region interposed therebetween, the second recessed region being formed to define a stepped portion together with the first recessed region, and the first sealing member may be provided between an inner surface of the second recessed region and an outer surface of the adapter member.

A width of the second recessed region may be larger than a width of the first recessed region in a region in which the first recessed region and the second recessed region meet together.

An outer diameter of the first sealing member may be larger than an outer diameter of the second sealing member.

A center of the first sealing member and a center of the second sealing member may each be positioned on a rotation center axis of the recessed region.

A concave section may be formed in an outer surface of the adapter member, and the first sealing member may be inserted into the concave section.

A second through-hole may be formed in the connector member and extend in a direction intersecting a direction in which the first through-hole extends, and the second sealing member may be provided to face the second through-hole.

The first sealing member may be spaced apart from the second through-hole in the direction in which the first through-hole extends.

The second sealing member may be provided to be spaced apart from a rotation center axis of the second through-hole toward the first through-hole.

The pipe port may further include: a cover member provided to surround an outer side of the adapter member and coupled to the connector member, in which the connector member and the cover member are optionally irreversibly coupled to each other.

The pipe port may further include: a connection member coupled to face the second through-hole, in which the connection member has a flow path provided to face the second through-hole, and in which the connection member is optionally irreversibly coupled to the connector member.

The pipe port may further include: a connection member coupled to face the second through-hole; and an O-ring member provided between the connection member and the connector member in a region in which the connection member is coupled to the connector member.

In order to achieve the above-mentioned object, another aspect of the present disclosure provides a pipe including: an inner pipe part having a first space S1 formed therein; an outer pipe part provided to surround an outer side of the inner pipe part and configured to define a second space S2 together with the inner pipe part; and a pipe port coupled to one side of the outer pipe part and having a space that communicates with the second space S2, in which the pipe port includes: a connector member having a recessed region with a shape recessed inward; an adapter member inserted into the recessed region of the connector member; and a first sealing member and a second sealing member provided between the connector member and the adapter member, and in which the first sealing member and the second sealing member are made of different materials.

In some embodiments, a pipe port comprises a connector member, an adapter member, and a first sealing member and a second sealing member positioned between the connector member and the adapter member. The pipe port also includes a cover member that surrounds the outer side of the adapter member and is coupled to the connector member. The first and second sealing members are made of different materials, and the connector member and the cover member are irreversibly coupled to each other. The connector member and the cover member may be welded to each other.

According to the present disclosure, it is possible to remarkably improve the sealability of the region in which vacuum or negative pressure is created to allow the pipe for transporting the cryogenic fluid to perform the thermal insulation function.

As discussed, the method and system suitably include use of a controller or processer.

DETAILED DESCRIPTION

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a pipe and a pipe port according to the present disclosure will be described with reference to the drawings.

Pipe

Figure 1:
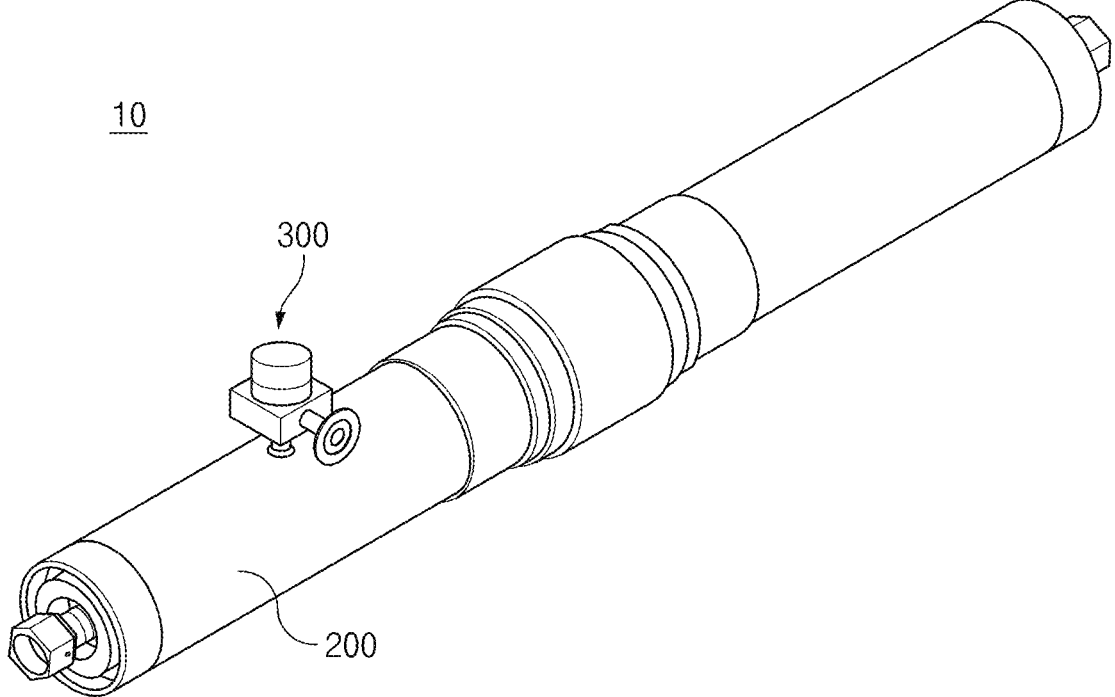
FIG. 1 is a perspective view illustrating a pipe according to an embodiment of the present disclosure.
Figure 2:
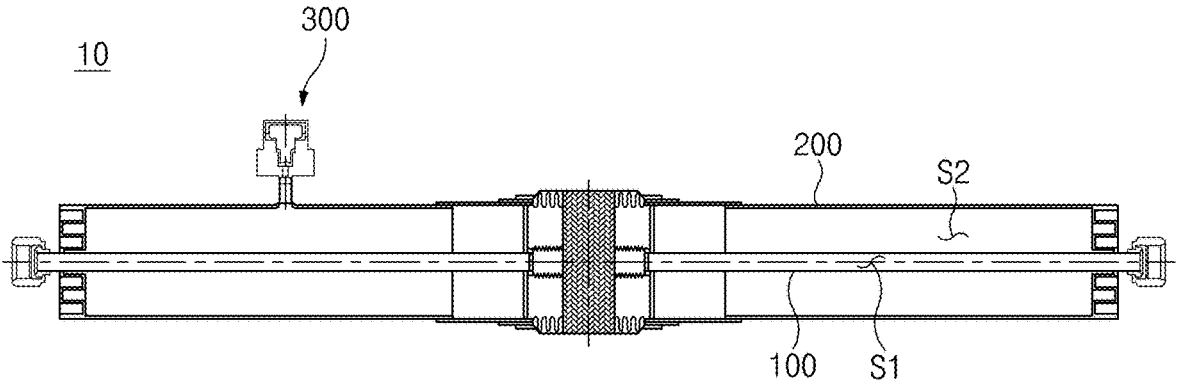
FIG. 2 is a cross-sectional view illustrating the pipe according to the embodiment of the present disclosure.

FIG. 1 is a perspective view illustrating a pipe according to an embodiment of the present disclosure, and FIG. 2 is a cross-sectional view illustrating the pipe according to the embodiment of the present disclosure.

A pipe 10 according to the present disclosure may be configured to provide a route through which a low-temperature fluid flows. For example, the pipe 10 according to the present disclosure may be configured to provide a route through which liquid hydrogen flows. Therefore, the pipe 10 according to the present disclosure may include a means for suppressing heat exchange between the outside of the pipe and the fluid flowing in the pipe.

In order to achieve the above-mentioned object, the pipe 10 according to the present disclosure may include an inner pipe part 100 having a first space S1 formed therein, and an outer pipe part 200 provided to surround an outer side of the inner pipe part 100 and configured to define a second space S2 together with the inner pipe part 100. More specifically, the first space S1 may define a route through which a fluid intended to be transported through the pipe 10 flows.

Meanwhile, the second space S2 may be defined by an outer surface of the inner pipe part 100 and an inner surface of the outer pipe part 200. When the low-temperature fluid flows in the pipe 10, the second space S2 may be in a vacuum state or a negative pressure state with pressure lower than atmospheric pressure. In this case, because air is thinned in the second space S2, heat exchange between the first space S1 and the outside of the pipe 10 may be effectively suppressed.

Meanwhile, the air present in the second space S2 needs to be discharged to the outside to keep the second space S2 in the vacuum or negative pressure state before the low-temperature fluid flows in the pipe 10. In order to achieve the above-mentioned object, the pipe 10 according to the present disclosure may further include a pipe port 300 coupled to one side of the outer pipe part 200 and configured to define a space that communicates with the second space S2. More specifically, the pipe port 300 may define a route through which the air in the second space S2 is discharged to the outside of the pipe 10. For example, one side of the pipe port 300 may be connected to a pump configured to suck air. When the pump operates, the air in the second space S2 may be discharged to the outside of the pipe 10 through the pipe port 300.

Hereinafter, the pipe port, which may be provided in the pipe 10 according to the present disclosure, will be described. The following description of the pipe port may, of course, be equally applied to the pipe according to the present disclosure.

Pipe Port

Figure 3:
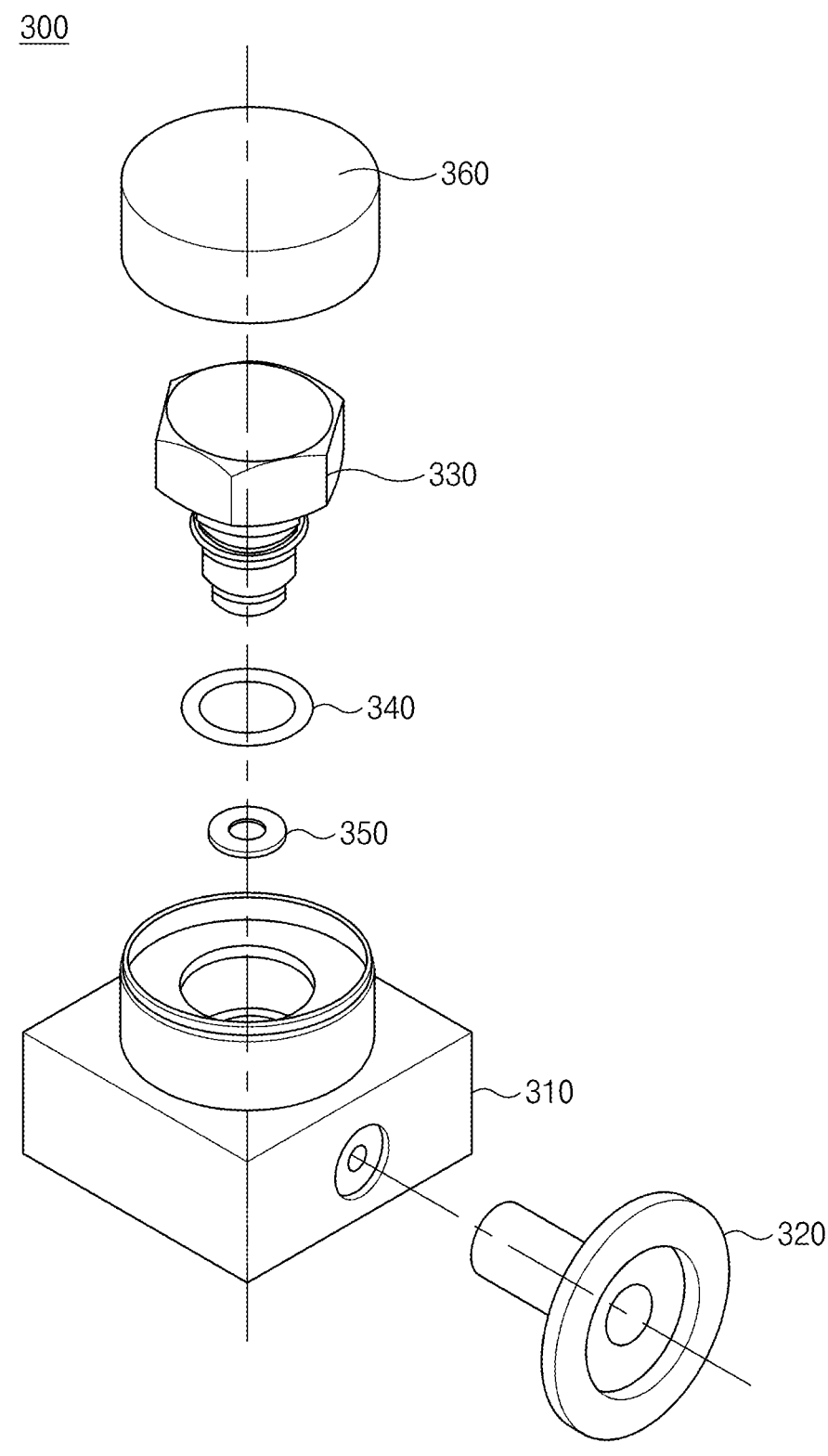
FIG. 3 is an exploded perspective view of a pipe port of the pipe according to the embodiment of the present disclosure.
Figure 4:
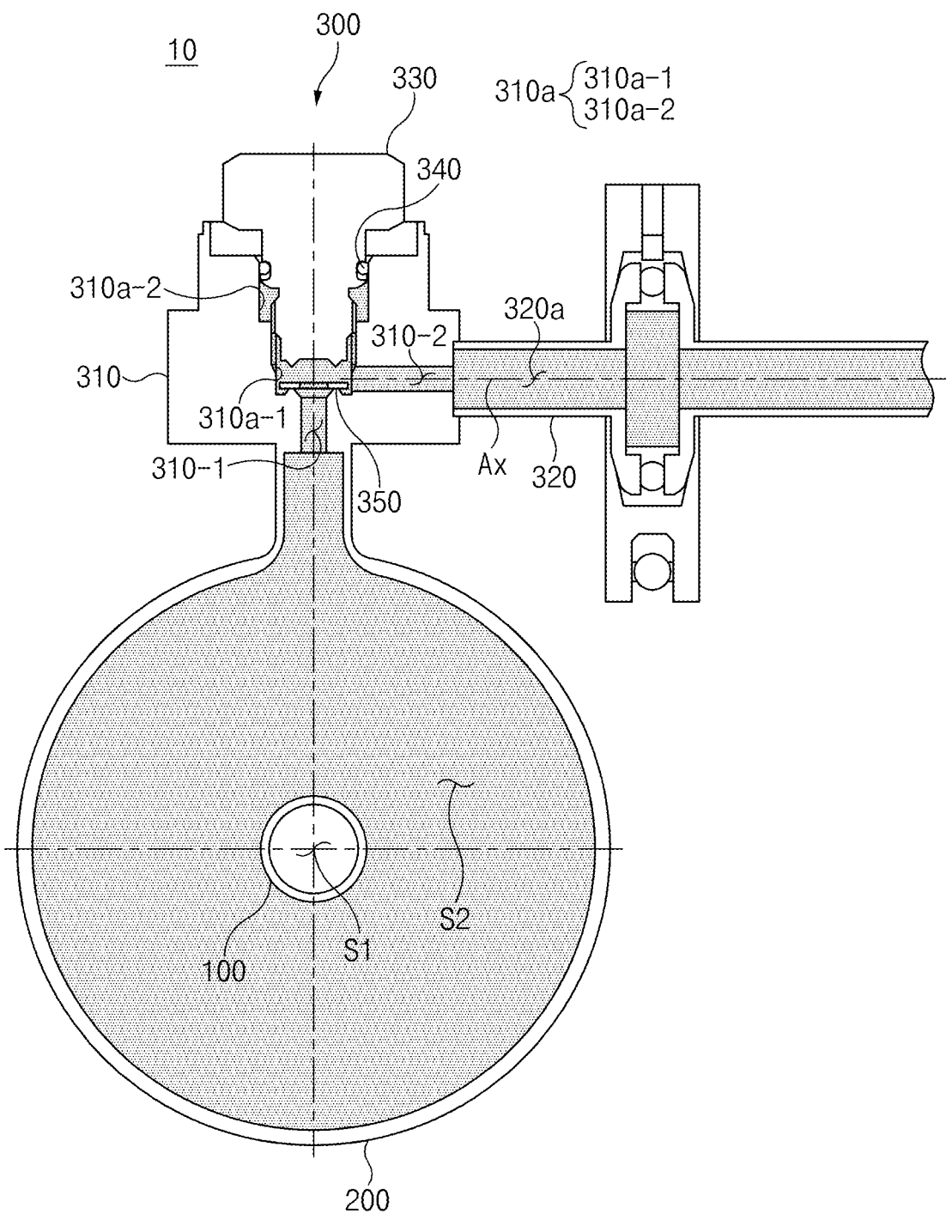
FIG. 4 is a view illustrating a cross-sectional structure of the pipe when air in a second space of the pipe according to the embodiment of the present disclosure is discharged.
Figure 5:
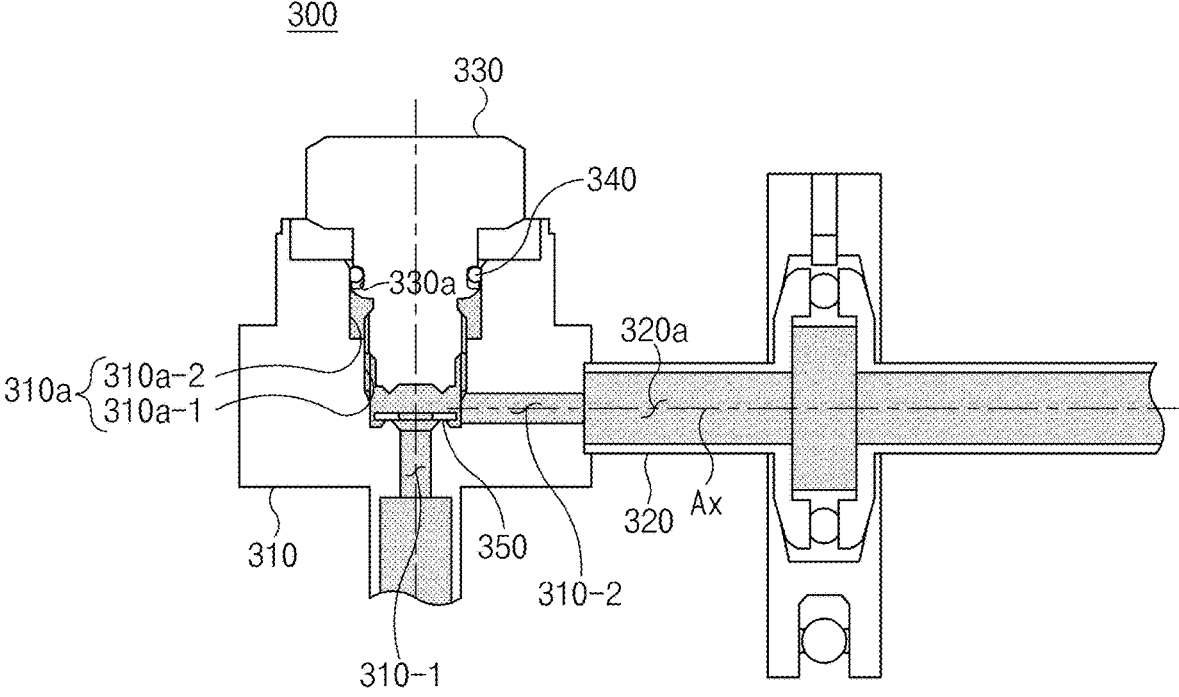
FIG. 5 is an enlarged view illustrating the pipe port in FIG. 4 and the surrounding thereof.
Figure 6:
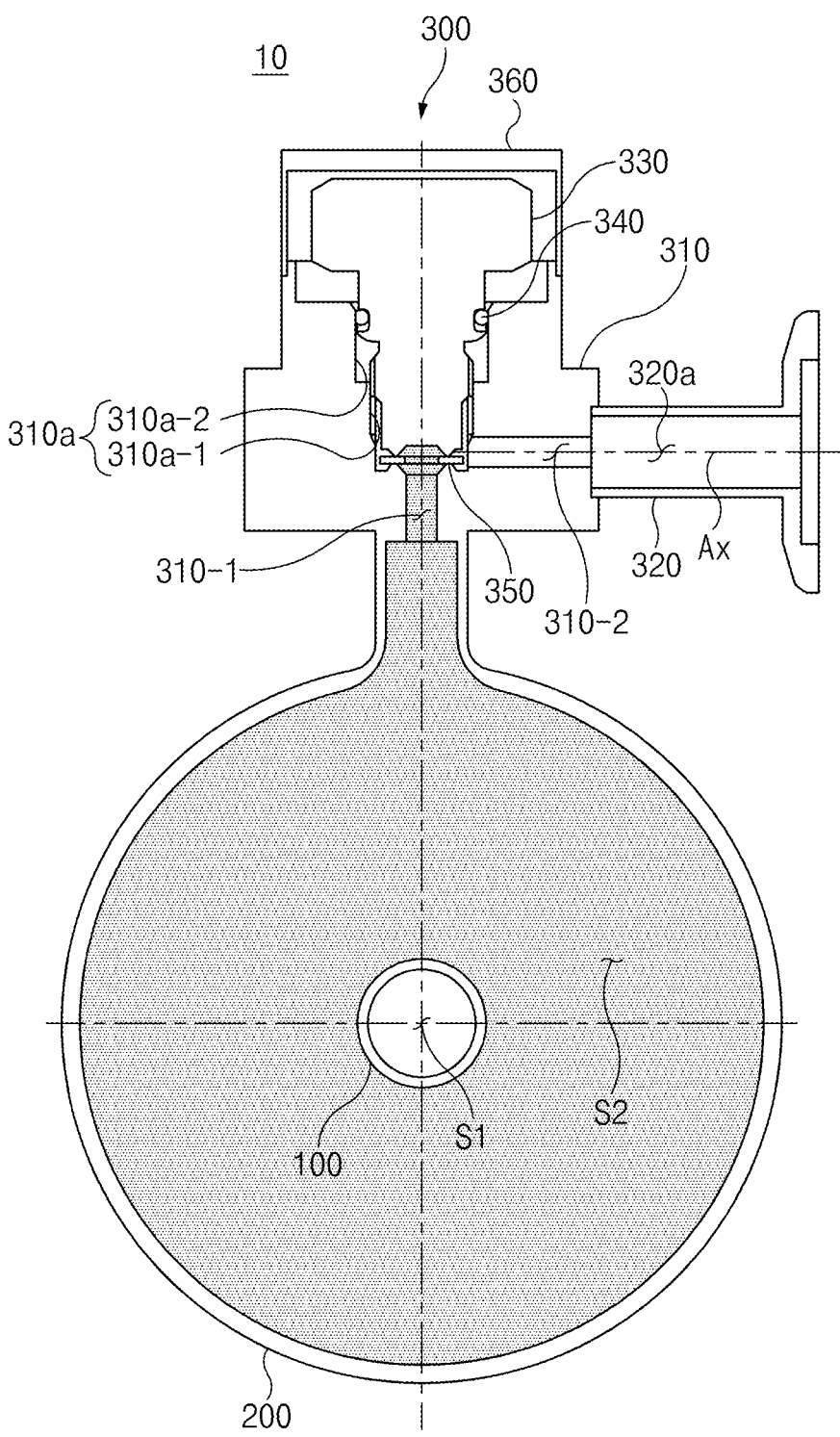
FIG. 6 is a view illustrating a cross-sectional structure of the pipe after a process of discharging air in the second space of the pipe according to the embodiment of the present disclosure is completed.
Figure 7:
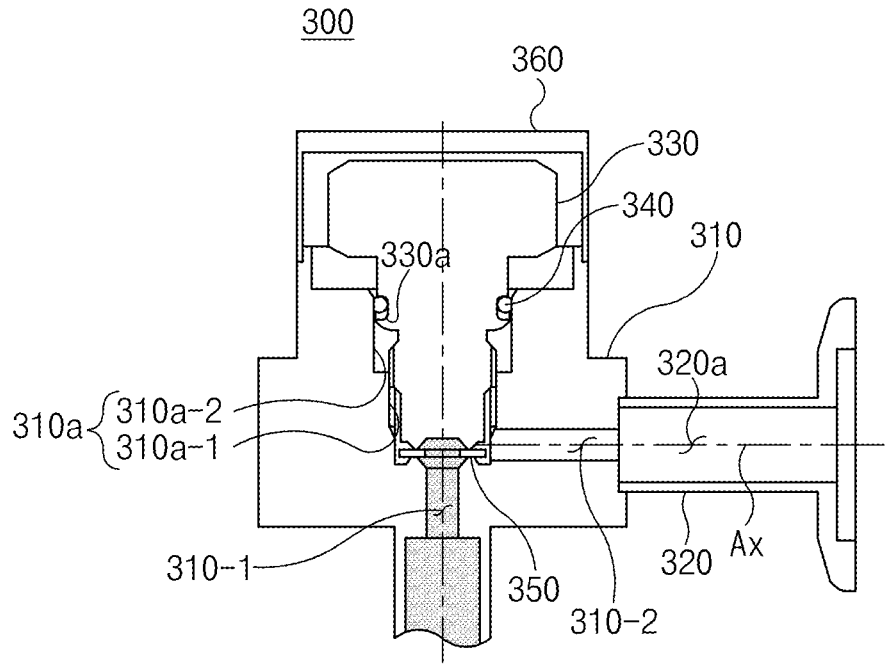
FIG. 7 is an enlarged view illustrating the pipe port in FIG. 6 and the surrounding thereof.

FIG. 3 is an exploded perspective view of the pipe port of the pipe according to the embodiment of the present disclosure, and FIG. 4 is a view illustrating a cross-sectional structure of the pipe when air in a second space of the pipe according to the embodiment of the present disclosure is discharged. FIG. 5 is an enlarged view illustrating the pipe port in FIG. 4 and the surrounding thereof, and FIG. 6 is a view illustrating a cross-sectional structure of the pipe after a process of discharging air in the second space of the pipe according to the embodiment of the present disclosure is completed. FIG. 7 is an enlarged view illustrating the pipe port in FIG. 6 and the surrounding thereof.

With reference to FIGS. 1 to 3, the pipe port 300 according to the present disclosure may include a connector member 310 having a recessed region 310a with a shape recessed inward, an adapter member 330 inserted into the recessed region 310a of the connector member 310, and a first sealing member 340 and a second sealing member 350 provided between the connector member 310 and the adapter member 330. The first sealing member 340 and the second sealing member 350 may be configured as separate components.

The first sealing member 340 and the second sealing member 350 may be configured to ensure sealability of the pipe port 300. More specifically, the first sealing member 340 may be not only configured to prevent air from leaking from a route, except for a predetermined route defined in the pipe port 300, in a step (hereinafter, referred to as a 'vacuum creating step') of discharging air, which is present in the second space S2 defined in the pipe 10, to the outside, but also configured to prevent outside air from being introduced into the second space S2 through the pipe port 300 after the vacuum creating step. Meanwhile, the second sealing member 350 may be configured to prevent outside air from being introduced into the second space S2 through the pipe port 300 after the vacuum creating step.

In particular, according to the present disclosure, the first sealing member 340 and the second sealing member 350 provided in the pipe port 300 may be made of different materials in order to improve the sealability of the pipe port 300 after the vacuum creating step. For example, the first sealing member 340 may include a rubber material or be an O-ring member made of a rubber material. The second sealing member 350 may be a metal seal member. Unlike the related art, according to the present disclosure, not only the O-ring member made of a rubber material but also the metal seal member is provided in the pipe port, to improve the sealability of the pipe port 300, which may effectively prevent air from being introduced into the second space S2 of the pipe 10 after the vacuum creating step. Hereinafter, a structure of the pipe port 300 will be described in detail.

With reference to FIGS. 4 to 7, a first through-hole 310-1, which is provided to face the adapter member 330, may be formed in the connector member 310 provided in the pipe port 300. The connector member 310 may be fixedly coupled to the outer pipe part 200, and the first through-hole 310-1 and the second space S2 may communicate with each other. Therefore, in the vacuum creating step, the air in the second space S2 may be discharged to the outside through the first through-hole 310-1.

In this case, according to the present disclosure, the second sealing member 350 may be provided between the first through-hole 310-1 and the adapter member 330. In this case, the second sealing member 350 may have a ring shape with an open middle region so that the air in the second space S2 may pass through the second sealing member 350 in the vacuum creating step.

Meanwhile, unlike the second sealing member 350, the first sealing member 340 may be spaced apart from the route through which the air in the second space S2 passes through the pipe port 300 in the vacuum creating step. More specifically, the first sealing member 340 may be spaced apart from the second sealing member 350 in a direction (an upward/downward direction based on FIGS. 4 to 7) in which the adapter member 330 and the first through-hole 310-1 face each other. It may be understood that the first sealing member 340 is provided to face the first through-hole 310-1 with the second sealing member 350 interposed therebetween. For example, FIGS. 4 to 7 illustrate that the first sealing member 340 is spaced apart upward from the second sealing member 350.

Meanwhile, according to the present disclosure, the recessed region 310a formed in the connector member 310 may be divided into a plurality of regions depending on the shape thereof. More specifically, the recessed region 310a may include a first recessed region 310a-1 configured to define a space in which the second sealing member 350 is provided, and a second recessed region 310a-2 provided to face the second sealing member 350 and the first through-hole 310-1 with the first recessed region 310a-1 interposed therebetween, the second recessed region 310a-2 being formed to define a stepped portion together with the first recessed region 310a-1. In this case, as illustrated in FIGS. 4 to 7, the first sealing member 340 may be provided between an inner surface of the second recessed region 310a-2 and an outer surface of the adapter member 330. More particularly, a concave section 330a having a recessed shape may be formed in an outer surface of the adapter member 330, and the first sealing member 340 may be inserted into the concave section 330a.

Meanwhile, the stepped portion may be formed between the first recessed region 310a-1 and the second recessed region 310a-2. More specifically, in a region in which the first recessed region 310a-1 and the second recessed region 310a-2 meet together, a width of the second recessed region 310a-2 may be larger than a width of the first recessed region 310a-1. More particularly, the width of the second recessed region 310a-2 may be larger than the width of the first recessed region 310a-1.

Meanwhile, as described above, the first sealing member 340 may be provided to face the second recessed region 310a-2, and the second sealing member 350 may be provided to face the first recessed region 310a-1. Therefore, the first sealing member 340 and the second sealing member 350 may have sizes respectively corresponding to sizes of the second recessed region 310a-2 and the first recessed region 310a-1.

In this case, because the width of the second recessed region 310a-2 may be larger than the width of the first recessed region 310a-1 as described above, an outer diameter of the first sealing member 340 may also be larger than an outer diameter of the second sealing member 350.

Meanwhile, in a more exemplary embodiment, a center of the first sealing member 340, a center of the second sealing member 350, and a center of the recessed region 310a may be formed coaxially. More specifically, the first sealing member 340, the second sealing member 350, and the recessed region 310a may each have a rotationally symmetrical shape. In this case, as illustrated in FIGS. 4 to 7, the center of the first sealing member 340 and the center of the second sealing member 350 may each be positioned on a rotation center axis of the recessed region 310a.

Meanwhile, the connector member 310 may further include a second through-hole 310-2 in addition to the first through-hole 310-1. However, unlike the first through-hole 310-1, the second through-hole 310-2 may be configured to communicate with the outside of the pipe 10.

For example, the second through-hole 310-2 may be formed in the connector member 310 and extend in a direction (a leftward/rightward direction based on FIGS. 4 to 7) intersecting a direction (the upward/downward direction based on FIGS. 4 to 7) in which the first through-hole 310-1 extends.

In this case, for example, the second sealing member 350 may be provided to face the second through-hole 310-2. As illustrated in FIGS. 4 to 7, it may be understood that the second sealing member 350 and the second through-hole 310-2 overlap each other in the direction intersecting the direction in which the second through-hole 310-2 extends. In contrast, as illustrated in FIGS. 4 to 7, the first sealing member 340 may be spaced apart from the second through-hole 310-2 in a direction (the upward direction based on FIGS. 4 to 7) in which the first through-hole 310-1 extends.

However, the second sealing member 350 may be spaced apart from a central axis of the second through-hole 310-2 even in case that the second sealing member 350 and the second through-hole 310-2 are provided to overlap each other. That is, in case that the second through-hole 310-2 has a rotationally symmetrical shape with respect to a rotation center axis AX, the second sealing member 350 may be spaced apart from the rotation center axis AX of the second through-hole 310-2 toward the first through-hole 310-1.

Meanwhile, with continued reference to FIGS. 4 to 7, the pipe port 300 according to the present disclosure may further include a cover member 360 provided to surround an outer side of the adapter member 330 and coupled to the connector member 310. In this case, the connector member 310 and the cover member 360 may be irreversibly coupled to each other. In this case, the configuration in which the two components are irreversibly coupled to each other may be understood as a configuration in which the two components are indivisibly coupled to the extent that the two components cannot be separated from each other as long as at least one of the two components is not damaged. For example, the connector member 310 and the cover member 360 may be coupled to each other by welding.

In addition, the pipe port 300 according to the present disclosure may further include a connection member 320 coupled to the connector member 310 so as to face the second through-hole 310-2. In this case, as illustrated in FIGS. 4 to 7, according to the embodiment of the present disclosure, a flow path 320a may be formed in the connection member 320 and face and communicate with the second through-hole 310-2, and the connection member 320 may be irreversibly coupled to the connector member 310. For example, the connection member 320 may be coupled to the connector member 310 by welding.

Figure 8:
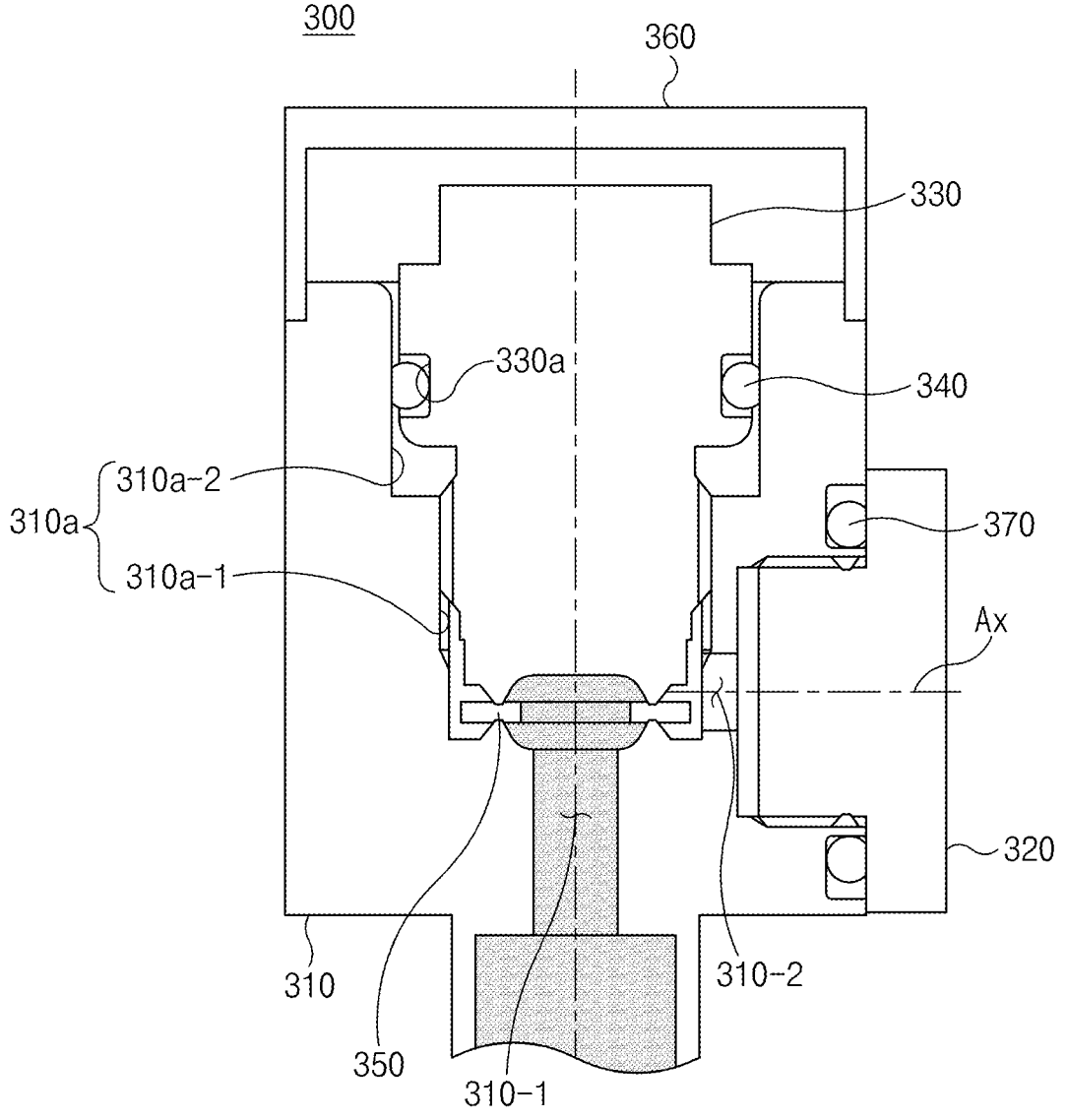
FIG. 8 is a cross-sectional view of a pipe port according to another embodiment of the present disclosure.

FIG. 8 is a cross-sectional view of a pipe port according to another embodiment of the present disclosure.

With reference to FIG. 8, even in another embodiment of the present disclosure, the pipe port 300 may further include the connection member 320 coupled to the connector member 310 so as to face the second through-hole 310-2. However, unlike the connection member according to the embodiment of the present disclosure described above with reference to FIGS. 4 to 7, the flow path, which communicates with the second through-hole 310-2, may not be formed in the connection member 320 according to another embodiment of the present disclosure. In addition, the pipe port 300 according to another embodiment of the present disclosure may further include an O-ring member 370 provided between the connection member 320 and the connector member 310 in a region in which the connection member 320 is coupled to the connector member 310.

Hereinafter, the vacuum creating step and the process subsequent to the vacuum creating step related to the pipe according to the present disclosure will be described with reference to the above-mentioned description.

With reference to FIGS. 4 and 5, in the vacuum creating step, the adapter member 330 may be in a state of being spaced apart from the second sealing member 350. However, even in this case, the first sealing member 340 may be kept in a sealed state by being positioned between the outer surface of the adapter member 330 and the inner surface of the recessed region 310a formed in the connector member 310. In this state, the air present in the second space S2 may sequentially pass through the first through-hole 310-1, the second sealing member 350, and the second through-hole 310-2 and then be discharged to the outside of the pipe according to the present disclosure.

Meanwhile, with reference to FIGS. 6 and 7, after the vacuum creating step is completed, the adapter member 330 may be moved, and the adapter member 330 may be tightly attached to the second sealing member 350. Therefore, the first through-hole 310-1 and the second space S2 may be sealed from the second through-hole 310-2. Furthermore, after the vacuum creating step is completed, the connector member 310 and the cover member 360 may be irreversibly coupled by welding or the like. Therefore, according to the present disclosure, the sealing may be implemented by i) the second sealing member 350, ii) the first sealing member 340, and iii) the coupling between the connector member 310 and the cover member 360. Therefore, according to the present disclosure, the sealability from the outside of the second space S2 may be remarkably improved after the vacuum creating step is completed.

Meanwhile, as illustrated in FIGS. 6 and 7, according to the embodiment of the present disclosure, the connection member 320 may be a component identical to a component that connects the second space S2 and the first through-hole 310-1 to the outside of the pipe in the vacuum creating step. However, alternatively, with reference to FIG. 8, the connection member 320 of the pipe port 300 according to another embodiment of the present disclosure may be a component that is newly fastened to the connector member 310 after the vacuum creating step is completed.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A pipe port comprising:
a connector member;
an adapter member; and
a first sealing member and a second sealing member provided between the connector member and the adapter member;
wherein the first sealing member and the second sealing member are made of different materials;
wherein a first through-hole, which is provided to face the adapter member, is formed in the connector member, and the second sealing member is provided between the first through-hole and the adapter member,
wherein a second through-hole is formed in the connector member and extends in a direction intersecting a direction in which the first through-bole extends, and the second sealing member is provided to face the second through-hole.

2. The pipe port of claim 1, wherein the first sealing member is an O-ring member, and the second sealing member is a metal seal member.

3. The pipe port of claim 1, wherein the connector member has a recessed region with a shape recessed inward, and the adapter member is inserted into the recessed region of the connector member.

4. The pipe port of claim 1, wherein the first sealing member is provided to be spaced apart from the second sealing member in a direction in which the adapter member and the first through-hole face each other.

5. The pipe port of claim 3, wherein the recessed region comprises:
a first recessed region configured to define a space in which the second sealing member is provided; and
a second recessed region provided to face the second sealing member with the first recessed region interposed therebetween, the second recessed region being formed to define a stepped portion together with the first recessed region, and
wherein the first sealing member is provided between an inner surface of the second recessed region and an outer surface of the adapter member.

6. The pipe port of claim 5, wherein a width of the second recessed region is larger than a width of the first recessed region in a region in which the first recessed region and the second recessed region meet together.

7. The pipe port of claim 5, wherein an outer diameter of the first sealing member is larger than an outer diameter of the second sealing member.

8. The pipe port of claim 5, wherein a center of the first sealing member and a center of the second sealing member are each positioned on a rotation center axis of the recessed region.

9. The pipe port of claim 5, wherein a concave section is formed on the outer surface of the adapter member, and the first sealing member is inserted into the concave section.

10. The pipe port of claim 1, wherein the first sealing member is spaced apart from the second through-hole in the direction in which the first through-hole extends.

11. The pipe port of claim 1, wherein the second sealing member is provided to be spaced apart from a rotation center axis of the second through-hole toward the first through-hole.

12. The pipe port of claim 1, further comprising:
a cover member provided to surround an outer side of the adapter member and coupled to the connector member.

13. The pipe port of claim 1, further comprising:
a connection member coupled to face the second through-hole,
wherein the connection member has a flow path provided to face the second through-hole, and
wherein the connection member is coupled to the connector member.

14. The pipe port of claim 1, further comprising:
a connection member coupled to face the second through-hole; and
an O-ring member provided between the connection member and the connector member.

15. A pipe port comprising:
a connector member;
an adapter member;
a first sealing member and a second sealing member provided between the connector member and the adapter member, and
a cover member provided to surround an outer side of the adapter member and coupled to the connector member,
wherein the first sealing member and the second sealing member are made of different materials,
wherein the connector member and the cover member are permanently coupled to each other.

16. The pipe port of claim 15, wherein the connector member and the cover member are welded to each other.

17. A pipe comprising:
an inner pipe part having a first space formed therein;
an outer pipe part provided to surround an outer side of the inner pipe part and configured to define a second space together with the inner pipe part; and
a pipe port coupled to one side of the outer pipe part and having a space that communicates with the second space,
wherein the pipe port comprises:
a connector member having a recessed region with a shape recessed inward;
an adapter member inserted into the recessed region of the connector member; and
a first sealing member and a second sealing member provided between the connector member and the adapter member; and
wherein the first sealing member and the second sealing member are made of different materials,
wherein a first through hole, which is provided to face the adapter member, is formed in the connector member, and the second sealing member is provided between the first through-hole and the adapter member,
wherein a second through-hole is formed in the connector member and extends in a direction intersecting a direction in which the first through-hole extends, and the second sealing member is provided to face the second through-hole.

18. The pipe of claim 17 further comprising a cover member provided to surround an outer side of the adapter member and coupled to the connector member,
wherein the connector member and the cover member are permanently coupled to each other.

* * * * *